J. K. KISSINGER.
SUPPLEMENTAL SPRING.
APPLICATION FILED APR. 2, 1915.
1,171,849.
Patented Feb. 15, 1916.
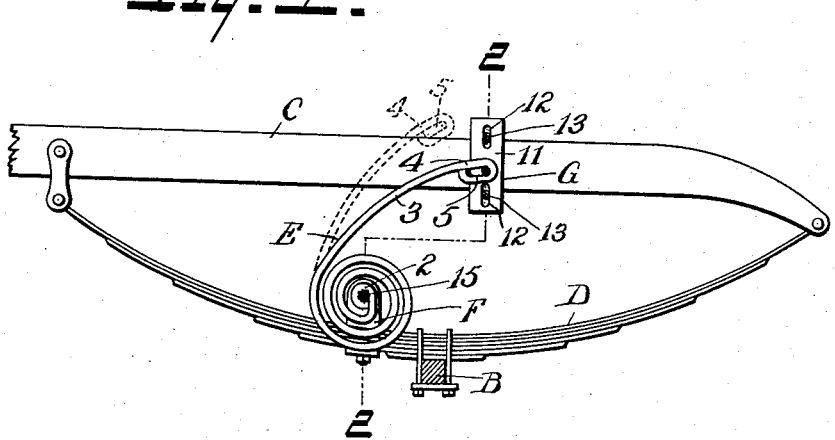
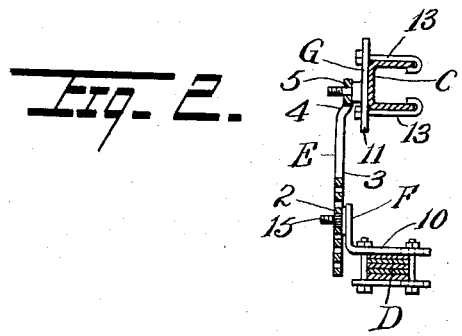
James K. Kissinger,
Inventor
his Attorneys

UNITED STATES PATENT OFFICE.

JAMES K. KISSINGER, OF READING, PENNSYLVANIA.

SUPPLEMENTAL SPRING.

1,171,849.  Specification of Letters Patent.  Patented Feb. 15, 1916.

Application filed April 2, 1915. Serial No. 18,738.

*To all whom it may concern:*

Be it known that I, JAMES K. KISSINGER, a citizen of the United States, residing at Reading, in the county of Berks and State of Pennsylvania, have invented certain new and useful Improvements in Supplemental Springs, of which the following is a specification.

My invention consists in an improved supplemental spring adapted to be conveniently arranged to coöperate with an ordinary vehicle spring, and capable of convenient tensioning adjustment for varying the effect as desired.

The invention is fully described in connection with the accompanying drawing, and the novel features are specifically pointed out in the claim.

Figure 1 illustrates my invention as applied to an ordinary vehicle structure; the disconnected position of the outer-end portion of the supplemental spring being indicated by dotted lines. Fig. 2 is partial cross-sectional view showing the clipped supports for opposite ends of the supplemental spring.

B represents a vehicle axle, C the body sill, and D an ordinary semi-elliptic spring interposed between the axle and body to yieldingly carry the load.

My invention consists in the improved supplemental spring arrangement shown, which will be fully described. This supplemental spring E is formed, as indicated, from a single steel bar; one extremity thereof being shaped to form an eye 2 around which the main bar is helically coiled in convolutions of gradually increasing radius, while the outer-end portion 3 of the bar extends beyond the coil and is provided with a support-engaging extremity 4. The eye or opening 2 at the center of the coil is axially ribbed or toothed internally, as shown, and the opposite extremity 4 is provided with an elongated support-engaging opening 5. Supporting means for the opposite ends of the supplemental spring are carried by the axle and body respectively. The lower support F is formed with a clamping portion 10 engaging the main spring adjacent the axle connection of the latter as shown, while the upper support G has a clamping portion 11 provided with slotted bolt openings 12, 12 for passage of clamping bolts 13, 13. These bolts 12 engage the body sill C as indicated, so as to permit of rigidly clipping the support G thereto, in properly adjusted position thereon both vertically and horizontally. The lower support F is provided with a bearing pin 15, which is externally toothed as shown to engage the internally toothed opening 2 of the supplemental spring; the latter being thus held from turning upon the pin when engaged upon the latter, and this engagement being readily adjustable so as to set the outer-end portion 3 of the spring as may be required to put desired tension on the supplemental spring when said outer-end portion 3 is sprung into engagement with the upper support G as shown in full lines Fig. 1. This tensioning of the supplemental spring may thus be very conveniently varied, with a corresponding variation in effect upon the action of the main spring so as to increase the carrying strength of the latter or neutralize jarring, as required; and the spring may be very conveniently and economically applied.

What I claim is:

In combination with a vehicle axle and a spring-supported body thereon, a supplemental spring formed of a helically coiled bar with an extended outer-end portion, and end supports for said spring carried respectively by said body and axle, the coiled end of said spring having an internally toothed opening, and one of said supports being correspondingly toothed exteriorly to adjustably engage the same.

In testimony whereof I affix my signature in presence of two witnesses.

JAMES ⨯ K. KISSINGER.
<sub>his      mark</sub>

Witnesses:
ADAM L. OTTERBEIN,
D. M. STEWART.

Copies of this patent may be obtained for five cents each, by addressing the "Commissioner of Patents, Washington, D. C."